United States Patent
Johnson et al.

(10) Patent No.: US 10,614,370 B2
(45) Date of Patent: Apr. 7, 2020

(54) QUANTUM COMPUTING AS A SERVICE (71) Applicant: QC Ware Corp., Moffett Field, CA (US)

(72) Inventors: Matthew C. Johnson, Palo Alto, CA (US); David A. B. Hyde, San Carlos, CA (US); Peter McMahon, Menlo Park, CA (US); Kin-Joe Sham, Blaine, MN (US); Kunle Tayo Oguntebi, Mountain View, CA (US); Asier Ozaeta Rodriguez, Palo Alto, CA (US)

(73) Assignee: QC Ware Corp., Palo Alto, CA (US)

( * ) Notice: Subject to any disclaimer, the term of this patent is extended or adjusted under 35 U.S.C. 154(b) by 492 days.

(21) Appl. No.: 15/446,973

(22) Filed: Mar. 1, 2017

(65) Prior Publication Data
US 2017/0223094 A1 Aug. 3, 2017

Related U.S. Application Data (63) Continuation-in-part of application No. 15/415,865, filed on Jan. 26, 2017.

(60) Provisional application No. 62/289,322, filed on Jan. 31, 2016.

(51) Int. Cl.
H04L 29/08 (2006.01)
G06N 10/00 (2019.01)

(52) U.S. Cl.
CPC .......... *G06N 10/00* (2019.01); *H04L 67/1004* (2013.01); *H04L 67/1017* (2013.01); *H04L 67/2823* (2013.01)

(58) Field of Classification Search
CPC . G06N 10/00; H04L 67/1004; H04L 67/2823; H04L 67/1017
See application file for complete search history.

(56) References Cited

U.S. PATENT DOCUMENTS

| 6,671,681 | B1 | 12/2003 | Emens et al. | |
|---|---|---|---|---|
| 7,219,018 | B2 * | 5/2007 | Vitaliano | G06N 10/00 702/19 |
| 7,877,333 | B2 * | 1/2011 | Macready | G06N 7/08 706/10 |
| 9,537,953 | B1 | 1/2017 | Dadashikelayeh et al. | |

(Continued)

FOREIGN PATENT DOCUMENTS

WO WO 2016/089711 A1 6/2016

OTHER PUBLICATIONS

Mechanism Design via Dantzig-Wolfe, Fadaei, Aug. 18, 2015 (Year: 2015).*

(Continued)

*Primary Examiner* — Michael A Keller
*Assistant Examiner* — Jsing Forng Lin
(74) *Attorney, Agent, or Firm* — Fenwick & West LLP (57) ABSTRACT

A cloud computing architecture and system for interaction with and use of quantum processing devices is presented. In one aspect, the invention comprises a unified platform as a service for interacting with various quantum processing devices. In another aspect, the invention provides an architecture and methodology for accessing and using a variety of quantum processing devices. Other aspects of the invention incorporate various software modules that provide additional functionality for users of quantum processing devices.

20 Claims, 3 Drawing Sheets (56) References Cited

U.S. PATENT DOCUMENTS

| | | | |
|---|---|---|---|
| 10,275,422 B2* | 4/2019 | Israel | G06F 17/11 |
| 2002/0188578 A1 | 12/2002 | Amin et al. | |
| 2003/0105805 A1 | 6/2003 | Jorgenson | |
| 2003/0169041 A1* | 9/2003 | Coury | G06N 10/00 |
| | | | 324/307 |
| 2008/0116449 A1 | 5/2008 | Macready et al. | |
| 2011/0022820 A1 | 1/2011 | Bunyk et al. | |
| 2013/0166353 A1 | 6/2013 | Mihic et al. | |
| 2014/0201126 A1 | 7/2014 | Zadeh et al. | |
| 2014/0237457 A1 | 8/2014 | Munshi et al. | |
| 2014/0275807 A1 | 9/2014 | Redei | |
| 2015/0006443 A1* | 1/2015 | Rose | G06K 9/00986 |
| | | | 706/12 |
| 2015/0046681 A1 | 2/2015 | King | |
| 2015/0106413 A1 | 4/2015 | Ronagh | |
| 2016/0011996 A1 | 1/2016 | Asaad et al. | |
| 2016/0224515 A1 | 8/2016 | Ronagh et al. | |
| 2017/0255872 A1* | 9/2017 | Hamze | G06F 9/02 |

OTHER PUBLICATIONS

PCT International Search Report and Written Opinion, PCT Application No. PCT/US17/15488, dated Apr. 20, 2017, 12 pages.

United States Office Action, U.S. Appl. No. 15/415,865, dated Feb. 15, 2019, 32 pages.

PCT International Search Report and Written Opinion, PCT Application No. PCT/US2015/020033, dated May 7, 2018, 18 pages.

Gunnerud et al., "Dantzig-Wolfe Decomposition for Real-Time Optimization-Applied to the Troll West Oil Rim," IFAC Proceedings, 2009, pp. 69-75, vol. 42, Issue 11, May be Retrieved at<URL:http://pdfs.semanticscholar.org/d8d0/d74939b16ab798525ae0772d6f1186556542.pdf>.

Brian Wang, Sparse Coding on D-Wave hardware, Publication Date: Apr. 29, 2013 https://www.nextbigfuture.com/2013/04/sparse-coding-on-d-wave-hardware.html.†

Fadaei, Mechanism Design via Dantzig-Wolfe Decomposition, Publication Date Aug. 18, 2015 https://arxiv.org/pdf/1508.04250v1.pdf.†

\* cited by examiner
† cited by third party

QUANTUM COMPUTING AS A SERVICE

CROSS-REFERENCE TO RELATED APPLICATION(S)

This application is a continuation-in-part of U.S. patent application Ser. No. 15/415,865, "Integration of Quantum Processing Devices with Distributed Computers," filed Jan. 26, 2017; which claims priority under 35 U.S.C. § 119(e) to U.S. Provisional Patent Application Ser. No. 62/289,322, "Architecture for Integration of Quantum Processing Device with Distributed Computer," filed Jan. 31, 2016. The subject matter of all of the foregoing is incorporated herein by reference in their entirety.

BACKGROUND

1. Field of the Invention

This invention relates to the field of quantum computing, and more specifically to quantum computing as a service.

2. Description of Related Art

Quantum processing devices exploit the laws of quantum mechanics in order to perform computations. Quantum processing devices commonly use so-called qubits, or quantum bits, rather than the bits used in classical computers. Classical bits always have a value of either 0 or 1. Roughly speaking, qubits have a non-zero probability of existing in a superposition, or linear combination, of 0 and 1. Certain operations using qubits and control systems for computing using qubits are further described in U.S. patent application Ser. No. 09/872,495, "Quantum Processing System and Method for a Superconducting Phase Qubit," which is hereby incorporated by reference in its entirety.

Although people have been aware of the utility of quantum algorithms for many years, only in the past decade has quantum computing hardware begun to become available at practical scales. In addition, the way in which users—such as application developers—have interacted with quantum processing devices to this point has largely been via low-level APIs, SDKs, and other software tools provided by hardware vendors. For example, D-Wave provides a low-level API to customers for connecting to and performing computations on D-Wave's quantum processing devices. In another instance, IBM provides a low-level assembly language for writing programs for IBM's recently-debuted quantum processing device. However, these low-level APIs, SDKs, and other software tools typically require certain expert knowledge to use effectively (such as deep familiarity with hardware architectural details of certain quantum processing devices) and, generally, using these tools places substantial burden on an application developer, when compared to conventional (non-quantum) software development. Moreover, these software development practices for quantum processing devices are often dependent on having access to quantum processing devices, when such access is (at present) extremely limited.

Therefore, there is a need for the development of a platform for quantum software development that enables portable (cross-platform) development with reduced time-to-development and without requiring deep hardware-specific knowledge. In addition, there is a need to develop a quantum computing platform and/or infrastructure service whereby a plethora of users with no special qualifications may interact with quantum processing devices. There is also a need for software and hardware architectures and methodologies that enable such developments.

SUMMARY

The present disclosure overcomes the limitations of the prior art by providing access to "quantum computing as a service" (QCaaS). Such a service may enable, for instance, development of software for quantum processing devices in a manner that reduces programmer burden and that offers cross-platform compatibility for different devices. In another aspect, service offerings allow users to use one or more quantum processing devices available through the service platform, for development, testing, and execution of quantum software, as well as for other such use cases reasonably afforded by quantum processing devices. Various software modules may provide additional functionality for users of quantum processing devices.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

The same reference numerals in the drawings correspond to equivalent or identical parts appearing in the different drawings. The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Example Process Flow for Preferred Architecture and System

Figure 1:
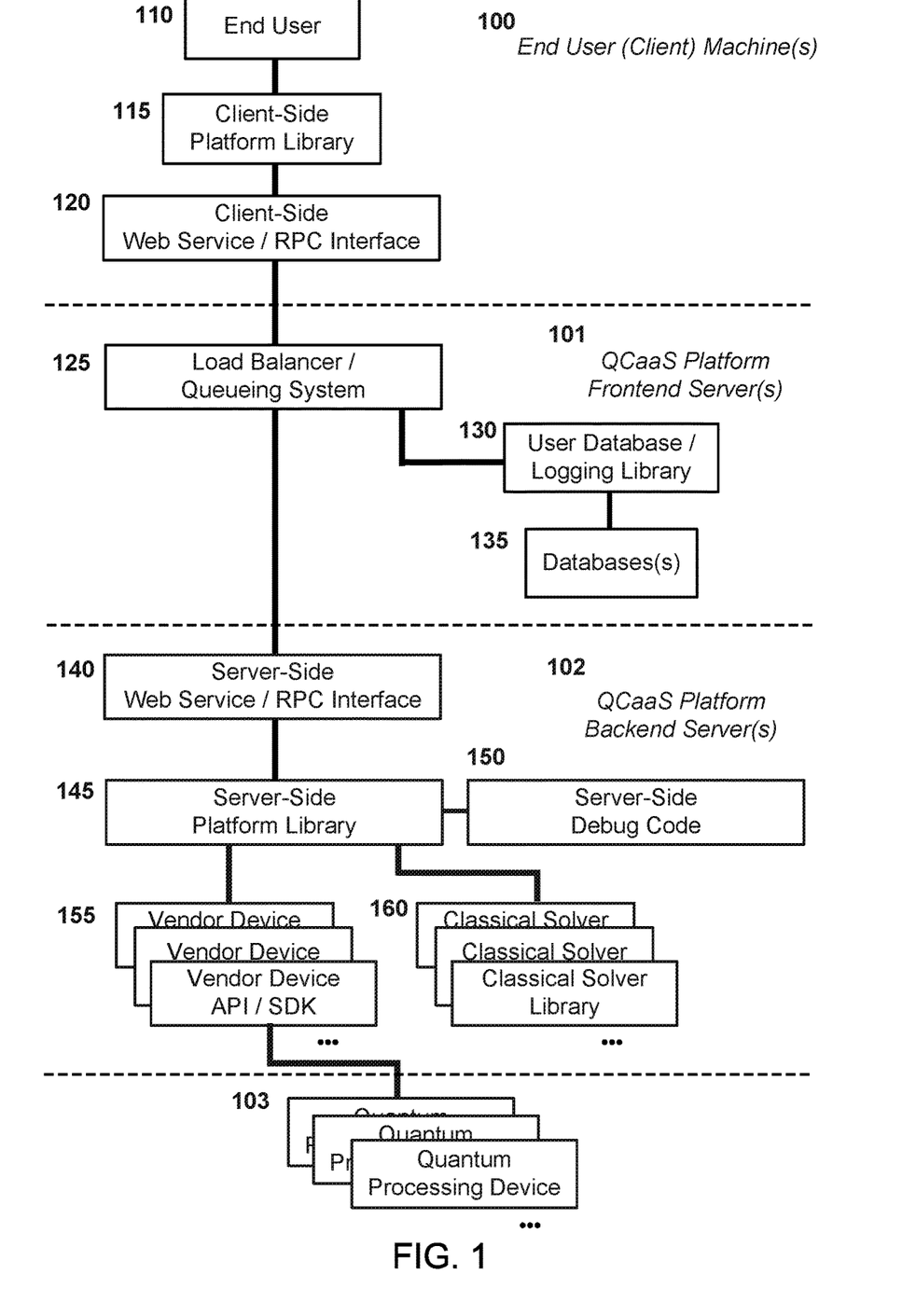
FIG. 1 is a logical diagram of one instance of a platform component of a QCaaS architecture and system, including certain related infrastructure components, described in accordance with one or more embodiments of the invention.

FIG. 1 is a logical diagram of one instance of a platform component of a QCaaS (quantum computing as a service) architecture and system, including certain related infrastructure components, described in accordance with one or more embodiments of the invention. In the diagram, dashed lines indicate boundaries where information passes between different machines and/or logical realms. In the diagram, an end user 110 working on a machine 100 interfaces with a client-side platform library 115 (explained in more detail in FIG. 3). This interaction may be, for example, the user inputting a problem in software code and calling a function in the client-side platform library 115 to pass that problem into the QCaaS system. The client-side platform library 115 then may communicate with a client-side web service or remote procedure call (RPC) interface 120 in order to transmit information about the problem to the remote QCaaS platform, for example in the form of user service requests.

Figure 3:
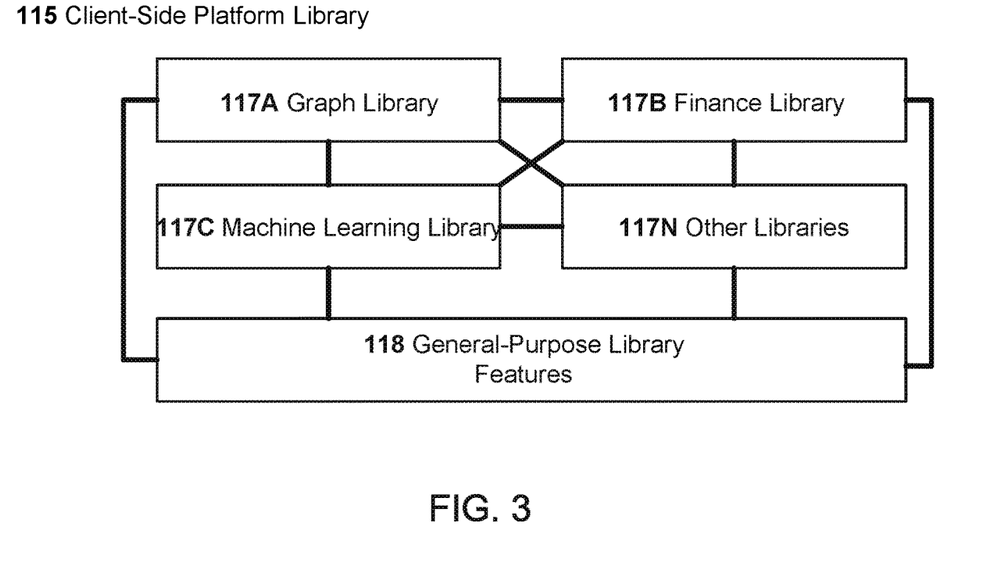
FIG. 3 is a logical diagram of some of the various software modules and components of the Client-Side Platform Library in FIG. 1, described in accordance with one or more embodiments of the invention.

The client-side platform library 115 may have any number of features to expose functionality for and ease the programming burden of the user. For instance, FIG. 3 shows several different modules that may be contained within the client-side library. This example includes a collection of general-purpose software routines, data structures, API endpoints, etc. in block 118. Additionally, the client-side library 115 may include any number of domain-specific libraries: collections of software routines, data structures, API endpoints, etc. that are designed specifically to aid with performing computations for specific domains. Examples include graph analytics 117A, finance 117B, machine learning 117C, or any other domains 117N. The additional libraries 117N need not be domain specific libraries but may be any such additional libraries or modules that add value and functionality to the client-side platform library 115. Preferably, the client-side platform library 115 is designed in such a way as to be extensible by any other such possible modules.

Once the information reaches the remote QCaaS frontend servers 101, the next step is to organize the user requests, for example by routing the information through a load balancer and/or queuing system 125. For instance, if many users are simultaneously using the QCaaS platform, and there are only limited computational resources available through the platform, some of the system preferable will schedule and order the processing of various users' submitted tasks in a reasonable manner. Any number of standard load balancing and queuing algorithms and policies may be used. For instance, one may use a standard round robin algorithm for load balancing.

When this information is passed to the QCaaS frontend servers 101, many potential tasks may be performed. For example, a frontend server 101 may authenticate the user 110 using a database 135 and library 130. The frontend server 101 may also log the information supplied by the user via a logging library 130 and store that information in a database 135. For instance, the frontend server might record copies of the problems that users submit to the platform.

When the load balancer/queuing system 125 deems that a problem is ready to run on the QCaaS system, the information is passed to one or more backend servers 102 in a format governed by a server-side web service/RPC interface 140. The backend servers 102 generally process the user problems to a form suitable for use with quantum processing devices.

Figure 2:
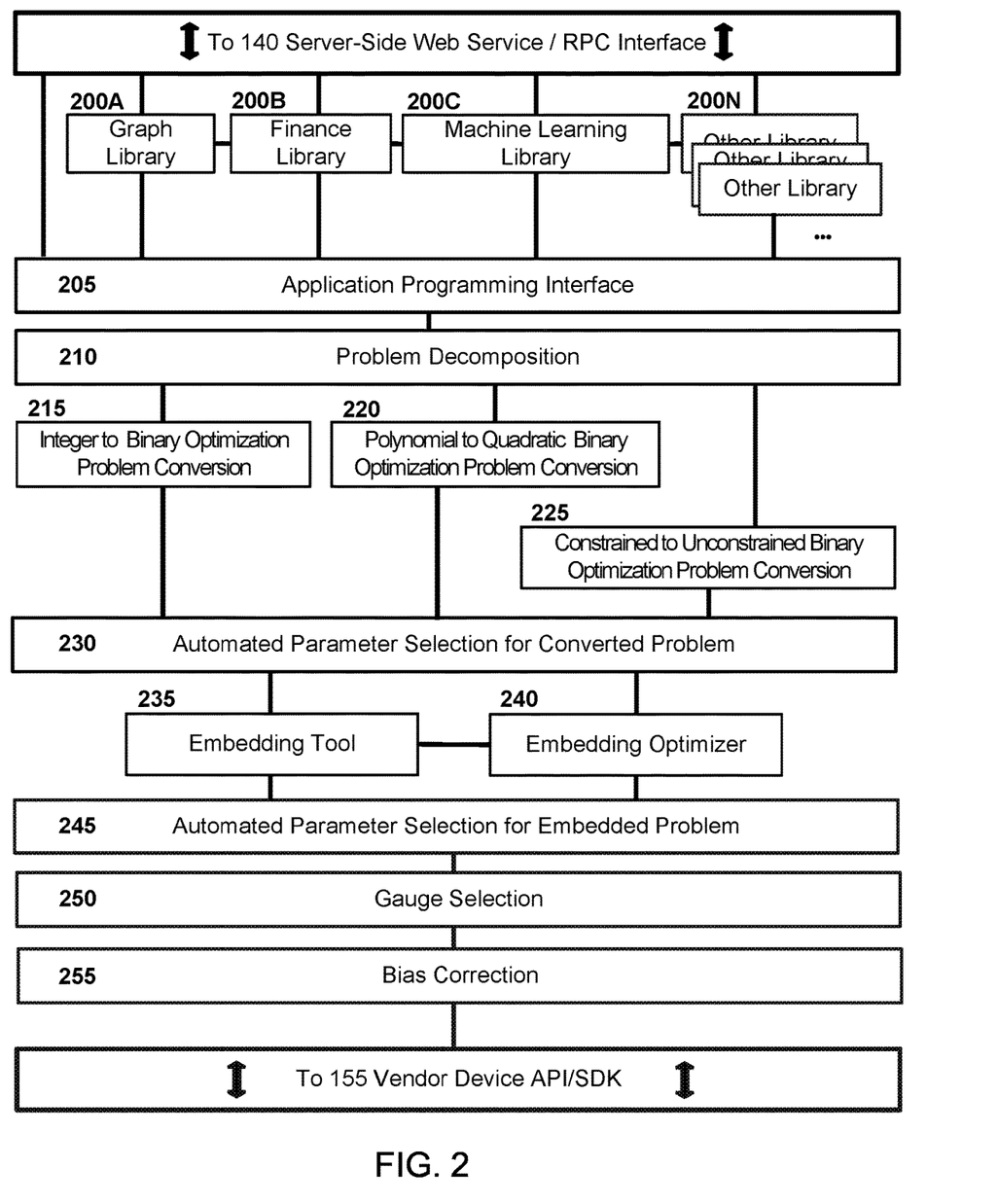
FIG. 2 is a logical diagram of some of the various software modules and components of the Server-Side Platform Library in FIG. 1, described in accordance with one or more embodiments of the invention.

Passing through the backend interface 140, the problem information arrives at the server-side platform library 145 (explained in more detail in FIG. 2). The platform library 145 may interact with debugging libraries 150 or other similar libraries (e.g. logging libraries). The platform library 145 contains a variety of algorithms for taking a computational problem, preparing it for solution on quantum processing devices, executing the computational problem on such devices, and collecting and returning the results. The platform library 145 is not necessarily limited to interacting with just quantum processing devices. One or more classical solver libraries 160 for conventional processing devices may also be used by the platform library 145 for various purposes (e.g. to solve some part of a problem that is not well-suited to a quantum processing solution, or to compare an answer obtained on a quantum processing device to an answer obtainable via a classical solver library).

Generally, though not necessarily, the server-side platform library 145 processes a computational problem and any relevant information about it and passes that processed form onto one or more quantum computing interfaces, such as quantum processing device vendor APIs and/or SDKs 155. For example, if the end user 110 is solving a quadratic binary optimization problem, this problem may be converted by 145 into a form amenable for a D-Wave quantum processing device, whereupon the server-side platform library 145 passes the processed form of the problem to the low-level D-Wave API 155. Low-level APIs like these directly interact with the underling quantum processing devices 103. The quantum processing devices return one or more solutions, and possibly other related information, which are propagated back up the chain, to 155 and then to 145. Solutions and information, e.g. from 150, 155, and 160, are passed to and coalesced by 145. The resulting coalesced data returns to the user, for example via a reverse path through the server-side interface 140, load balancer 125, client-side interface 120, and client-side platform library 115, to finally arrive back at the end user 110.

The quantum processing devices 103 may be one or more physical devices that perform processing especially based upon quantum effects, one or more devices that act in such a way, one or more physical or virtual simulators that emulate such effects, or any other devices or simulators that may reasonably be interpreted as exhibiting quantum processing behavior.

Examples of quantum processing devices include, but are not limited to, the devices produced by D-Wave Systems Inc., such as the quantum processing devices (and devices built upon the architectures and methods) described in U.S. patent application Ser. No. 14/453,883, "Systems and Devices for Quantum Processor Architectures" and U.S. patent application Ser. No. 12/934,254, "Oubit [sic] Based Systems, Devices, and Methods for Analog Processing," both of which are hereby incorporated by reference in their entirety. Other quantum processing devices are under development by various companies, such as Google and IBM.

Because quantum processing devices operate on qubits, the ability of qubits to exist in superpositions of 0 and 1 allows for greatly enhanced performance for certain computational tasks. For example, Shor's algorithm describes how a quantum processing device can be used to efficiently factor large integers, which has significant applications and implications for cryptography. Grover's search algorithm describes how a quantum processing device can be used to efficiently search a large set of information, such as a list or database. For further examples, see e.g. Shor, 1997, SIAM J. of Comput. 26, 1484; Grover, 1996, Proc. 28th STOC, 212 (ACM Press, New York); and Kitaev, LANL preprint quant-ph/9511026, each of which is hereby incorporated by reference in their entireties.

Server-Side Platform Library

FIG. 2 is a logical diagram of some of the various software modules and components of the Server-Side Platform Library 145 in FIG. 1, described in accordance with one or more embodiments of the invention. Data flows into and out of the platform library 145 via the interfaces 140,155 at the top and bottom of the diagram, corresponding to connections to other components in FIG. 1.

The platform library 145 may contain one or more domain-specific libraries 200 that may be useful for developing software for or solving problems on quantum processing devices. Each domain-specific library may include software routines, data models, and other such resources as may typically appear in a software library, just as in the case of the client-side platform library 115 shown in FIG. 3. FIG. 2 specifically shows graph analytics 200A, finance 200B, and machine learning 200C as domains where domain-specific libraries and routines may be especially useful, but library 200N emphasizes that any domain-specific library may be incorporated at this layer of the platform library. The numbering 200A-N emphasizes the extensible nature of the platform library. Based upon the components lower down in the diagram, any number of domain-specific libraries 200 may be written and integrated into the platform library 145.

The API 205 exposes the functions, data structures, models, and other core interfaces of the platform library 145. The API 205 may connect with one or more libraries 200A-N and/or may directly communicate with the server-side web service/RPC interface 140, depending on the information being supplied to the platform library 145. The API 205 is responsible for examining a problem and whatever information is supplied to the platform library 145 and determining how to execute the problem on quantum processing devices and/or classical solver libraries, with the help of the remaining modules shown in FIG. 2.

One such module is problem decomposition module 210. The processes conducted by this module involve taking a large problem and splitting it into smaller subproblems, whose solutions may be combined to obtain an exact or approximate solution to the entire problem. For example, if one is solving the Traveling Salesman Problem (TSP) for a large number of cities, there are heuristics in the literature for how to decompose the problem into multiple smaller TSP subproblems over smaller numbers of cities, and to then recombine the solutions of those subproblems into an approximate solution for the overall TSP problem.

An example of a canonical problem decomposition method that may be used in the platform is described in Benders, J. F. Numer. Math. (1962) 4: 238. doi:10.1007/BF01386316, which is incorporated by reference here in its entirety. In Benders' method, an optimization problem is split into an alternating sequence of linear and integer optimization problems that are each easier to solve than the overall optimization problem, which may be nonlinear, non-integer, etc. Benders' method offers certain bounds showing that a solution obtained via the decomposition method is within some approximation of the overall problem's optimal solution.

Another example of a problem decomposition method is the well-known Dantzig-Wolfe decomposition, explained for example on https://en.wikipedia.org/wiki/Dantzig%E2%80%93Wolfe_decomposition, which is incorporated by reference here in its entirety. In the Dantzig-Wolfe method, a linear programming problem of a certain structure is split into a set of subproblems involving distinct subsets of the problem variables. Optimal values of the subproblems are evaluated in the overall problem and are used as the next iterate in the algorithm if the value of the overall problem is improved.

Another potential problem decomposition approach is based on the "randomized search" idea used in, for example, U.S. patent application Ser. No. 13/332,721, which is incorporated by reference here in its entirety. Overall, problem decomposition is especially useful in the context of QCaaS since the currently commercially available quantum processing devices have significantly limited memory. Hence, many problems of practical size must be decomposed in order to fit into the memories of the available quantum processing devices.

The modules, 215, 220, and 225, relate to taking a discrete optimization problem of one form and converting it into a quadratic binary unconstrained form. While certainly not all problems solved on quantum processing devices are discrete optimization problems, the relatively popular D-Wave quantum processing devices have been found to be especially well-suited for this class of problems. Hence, the platform library 145 includes these special modules 215, 220, and 225.

Module 215 uses heuristics to convert an integer optimization problem into a binary optimization problem. One such heuristic operates when the integer formulation of the optimization problem is over a finite set of choices. For instance, if a variable in an integer optimization problem may take on the values 2, 3, or 4, then this may be recast as three binary variables corresponding to (a) whether or not the value is 2, (b) whether or not the value is 3, and (c) whether or not the value is 4, along with some mutual exclusivity constraints between the three binary variables (e.g., the sum of the three binary variables must equal one). While this is a standard heuristic used for integer to binary optimization problem conversion, other heuristics and algorithms may be implemented by module 215 as appropriate.

Module 220 uses heuristics to convert a higher-order polynomial binary optimization problem into a quadratic binary optimization problem. In one embodiment, module 220 use a third-party software library to provide such functionality (indeed, this is generally true of all components of the platform). For instance, module 220 may use the "reduce_degree" utility in the D-Wave low-level API. Another approach is based on adding penalty terms to ensure that ancillas get the correct values (if penalty terms are too small, ancillas may easily obtain the wrong values). Such an approach is documented in arXiv:0801.3625v2 [quant-ph], which is incorporated by reference here in its entirety.

Module 225 uses heuristics involving penalty terms to convert a constrained binary optimization problem into an unconstrained binary optimization problem. One implementation of this module is documented in Pierre Hansen, "Methods of Nonlinear 0-1 Programming," Annals of Discrete Mathematics, Elsevier, 1979, which is incorporated by reference here in its entirety. Other mathematical techniques for constrained to unconstrained conversion for binary optimization problems will be apparent.

Depending on the input provided to the platform library 145, none, one, some, or all of these modules 215, 220, 225 may be used in order to prepare the problem for solution on the quantum processing devices and/or other solver libraries underlying the platform. Other such modules are certainly possible and may also be used within the platform. For instance, one such module converts formulations of problems that can be run on quantum annealing processing devices (such as the quantum processing devices developed by D-Wave) to formulations that can be run on gate-model quantum processing devices. Such a module may work via "Trotterization," see e.g. arXiv:1611.00204v2 [quant-ph] (which is incorporated by reference here in its entirety). Another such possible module would convert gate-model formulations of certain problems into formulations amenable to solution on quantum annealing processing devices.

Other additional relevant modules may be included at this layer of the platform. The above list is not exhaustive.

Module 230 provides optimizations for the processed problem in order to improve the quality of the solution obtained via the platform. The operations performed are documented in arXiv:1503.01083v1 [quant-ph], which is incorporated by reference here in its entirety. Roughly speaking, we first obtain the strict embedding (the percentage of chains whose qubits all take the same value) for different values of intracoupling strength $J_E$. We then fit this data with a Sigma curve. Next, we use the Sigma curve to determine the point at which the strict embedding is 0.5. Then, for a defined range of values centered at 0.5, we calculate the $\pi_{elite}$ value (the best percentage of the obtained logic energies). Finally, we use the $J_E$ value that results in the best $\pi_{elite}$.

When the problem is in an optimized state, embedding tools 235, 240 may be run to fit the problem onto a model of the particular hardware architecture of a target quantum processing device. For instance, if a problem is to be solved using a D-Wave quantum processing device, these tools will map the problem onto the chimera graph architecture of that device. The embedding tool 235 may be vendor-supplied or a third-party library, whereas tool 240 can take the output of another embedding tool 235 and provide additional optimizations to make the embedding as compact as possible.

Tool 240 may function by comparing an input problem to similar problems input in the past, and using the good embeddings found for those prior problems as starting points for computing good embeddings for the current input problem. Alternatively, 240 may operate by running the embedding tool 235 multiple times, and choosing the best result to use as the embedding (such may be the mode of operation when tool 235 produces different outputs for different executions). The "best" output of tool 235 may be the embedding with the fewest number of qubits used, the embedding with the shortest chain lengths, or some other criteria that may be specified. Other techniques may be incorporated into the platform for selecting and optimizing embeddings.

The embedded problem (output of tools 235 and/or 240) is then optimized for execution on a specific device via modules 245, 250, 255. One such process is essentially the same process as performed by embedding tool 230. Additionally, for example, with a D-Wave quantum processing device, there are a number of gauges that can be tuned via the low-level D-Wave API, and biases in couplers and local fields (which distort results) may exist in the device. The gauge selection module 250 is based on the techniques in arXiv:1503.01083v1 [quant-ph], which is incorporated by reference here in its entirety.

The idea of this gauge selection method is to study the gauge space, which is worth understanding. We set a number of gauges that we apply to our embedded problem, and we solve that problem for a given number of runs. Then, using different parameters, such as the $\pi_{elite}$ value, we choose the elite gauges based on their scores. Usually these are several gauges that we run more in depth, assuming that they will return better solutions. This metric is usually quite noisy, and thus the choice of several gauges. For bias correction, the platform may use, for example, the D-Wave-provided automatic bias correction feature. Other bias correction strategies are known in the literature, and such strategies may be incorporated into the platform as appropriate as various quantum processing devices become available and mature. Overall, these modules ensure the optimal device-level parameters are automatically selected, obviating the need for the end user 110 to possess deep architecture- and device-specific knowledge in order to obtain high-quality solutions.

Note that the collection of modules in the server-side platform library may be executed iteratively or in the style of a "feedback loop," where one or more of the modules are executed repeatedly, either in parallel or in serial. For example, one may wish to re-execute both the embedding routines 235 and then the automated parameter selection 245 in order to obtain a better embedding and better parameters for the embedded problem. Generally, many of the modules, e.g. 230, 235, 240, 245, 250, 255, etc., may benefit from multiple executions, and as such, the platform may include options and modes for executing some or all of the modules repeatedly in the style of a feedback loop in order to obtain more suitable results. The platform does not restrict which modules may be run in this iterative fashion.

At the very end of the process, the optimized problem is dispatched to one or more vendor device APIs/SDKs 155. At a later point in time, solutions are returned and are passed back to the end user, as described above and as shown in FIG. 1.

While not shown in FIG. 2, classical solver libraries 165 may be interfaced with FIG. 2 via connections to, for example, one or more of modules 205, 210, 215, 220, and 225. Depending on the classical solver library, other connections may also be possible or appropriate.

Although the detailed description contains many specifics, these should not be construed as limiting the scope of the invention but merely as illustrating different examples and aspects of the invention. It should be appreciated that the scope of the invention includes other embodiments not discussed in detail above. For instance, the specific modules, functions and features may vary from one implementation to the next. As an example, one may add a monitoring server into the architecture presented in FIG. 1 that gathers statistics about each of the components in the system. One may also add a component for administration of the system depicted in FIG. 1. The components shown in FIGS. 1-3 are not all required and may be combined or reordered in different ways.

More generally, the QCaaS platform described above is just one example of how quantum processing devices may be offered on an "as a service" basis. In this use model, the user remotely accesses a service provider's software and/or hardware resources, as opposed to "on-prem" (on-premise) solutions that are collocated with the end user. However, this use model can be applied to many types of quantum computing-related resources, including software, platform and infrastructure. "Software as a service" (SaaS) is typically accessed via the Internet and encompasses a broad variety of applications, from enterprise accounting tools to consumer social media websites. "Platform as a service" (PaaS) provides software and/or hardware resources—typically for use by application developers—to clients. Infrastructure as a Service (IaaS) is another example wherein hardware or software components that may reasonably be construed to be "infrastructure" (for instance, database server hardware and software) is made available to remote clients. The principles described above can be extended to any of these aspects.

In QCaaS, it is also possible to have a scheduler for multiple quantum processing devices that is hidden from the end users. This scheduler can be used, for example, to automatically load balance and scale runs across multiple quantum processing devices and to automatically load balance and queue the workloads of multiple users on the same resources. Even as a scheduler for multiple runs on the same computer, it will not be serial like if run directly on a quantum processing device. Additionally, QCaaS can encompass a way to determine how many runs is good enough for the answer to a given problem, so the number of runs would be different for each problem and would be determined in a way that need not be exposed to the end user. This is different from the conventional model of using a quantum processing device, where the number of runs is explicitly specified.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules, even if drawn as separate elements in the figures.

What is claimed is:

1. A platform for providing quantum computing as a service, the platform comprising physical processors and physical memory, the platform executing instructions to implement:
 a client side interface;
 a frontend server that receives user service requests from a plurality of users via the client side interface, the user service requests to be performed on quantum processing devices not dedicated to or directly accessible by any of the users, the frontend server organizing the user service requests;
 a server side interface;
 a backend server that receives the user service requests from the frontend server via the server side interface, the backend server processing the user service requests to a form suitable for quantum processing devices, wherein the backend server includes:
  one or more platform libraries for converting user service requests in specific application domains to the form suitable for quantum processing devices, the one or more platform libraries including at least one of a graph library, a finance library, or a machine learning library, and
  a module that converts an integer optimization problem into a binary optimization problem; and
 a quantum computing interface, the backend server transmitting the user service requests to the quantum processing devices via the quantum computing interface.

2. The platform of claim 1 wherein the backend server further includes one or more classical solver libraries for converting user service requests to a form suitable for conventional processing devices.

3. The platform of claim 1 wherein the backend server further includes a problem decomposition module that splits a larger problem in a user service request into multiple smaller problems, the smaller problems to be solved by the quantum processing devices.

4. The platform of claim 3 wherein the problem decomposition module applies at least one of Benders' method, Dantzig-Wolfe decomposition, or a randomized search decomposition.

5. The platform of claim 1 wherein the backend server further includes a module that converts a discrete optimization problem into a quadratic binary unconstrained form.

6. The platform of claim 1 wherein the backend server further includes a module that converts a higher-order polynomial binary optimization problem into a quadratic binary optimization problem.

7. The platform of claim 1 wherein the backend server further includes a module that converts a constrained binary optimization problem into an unconstrained binary optimization problem.

8. The platform of claim 1 wherein the backend server further includes an embedding tool that processes the user service requests to a form suitable for a specific target quantum processing device that will execute the service request.

9. The platform of claim 8 wherein the embedding tool compares a current user service request to prior user service requests and processes the current user service request based on similarity to the prior user service requests.

10. The platform of claim 1 wherein the backend server iteratively executes user service requests on the quantum processing devices.

11. The platform of claim 1 wherein the frontend server performs load balancing and/or queuing of the user service requests.

12. The platform of claim 1 wherein the frontend server authenticates the users.

13. The platform of claim 1 wherein the frontend server logs user service requests.

14. The platform of claim 1 wherein the quantum processing devices are located remotely from the users, and the platform provides access to the quantum processing devices as a paid service to the users.

15. The platform of claim 1 wherein the client side interface is a web service/RPC interface.

16. A platform for providing quantum computing as a service, the platform comprising physical processors and physical memory, the platform executing instructions to implement:
   a client side interface;
   a frontend server that receives user service requests from a plurality of users via the client side interface, the user service requests to be performed on quantum processing devices not dedicated to or directly accessible by any of the users, the frontend server organizing the user service requests;
   a server side interface;
   a backend server that receives the user service requests from the frontend server via the server side interface, the backend server processing the user service requests to a form suitable for quantum processing devices, wherein the backend server includes:
      one or more platform libraries for converting user service requests in specific application domains to the form suitable for quantum processing devices, the one or more platform libraries including at least one of a graph library, a finance library, or a machine learning library, and
      a module that converts a higher-order polynomial binary optimization problem into a quadratic binary optimization problem; and
   a quantum computing interface, the backend server transmitting the user service requests to the quantum processing devices via the quantum computing interface.

17. The platform of claim 16 wherein the backend server further includes a problem decomposition module that splits a larger problem in a user service request into multiple smaller problems, the smaller problems to be solved by the quantum processing devices.

18. The platform of claim 16 wherein the backend server further includes a module that converts an integer optimization problem into a binary optimization problem.

19. The platform of claim 16 wherein the backend server further includes a module that converts a constrained binary optimization problem into an unconstrained binary optimization problem.

20. The platform of claim 16 wherein the backend server further includes an embedding tool that processes the user service requests to a form suitable for a specific target quantum processing device that will execute the service request, wherein the embedding tool compares a current user service request to prior user service requests and processes the current user service request based on similarity to the prior user service requests.

* * * * *